US 10,841,887 B2

(12) United States Patent
Houdebine (10) Patent No.: US 10,841,887 B2
(45) Date of Patent: Nov. 17, 2020

(54) SYNCHRONIZATION BETWEEN A READER AND AN OBJECT IN CONTACTLESS COMMUNICATION WITH THE READER BY ACTIVE LOAD MODULATION

(71) Applicant: STMicroelectronics SA, Montrouge (FR)

(72) Inventor: Marc Houdebine, Crolles (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 16/250,443

(22) Filed: Jan. 17, 2019

(65) Prior Publication Data

US 2019/0230611 A1  Jul. 25, 2019

(30) Foreign Application Priority Data

Jan. 19, 2018 (FR) ..................... 18 50428

(51) Int. Cl.
*H04W 56/00* (2009.01)
*H04L 7/033* (2006.01)
(Continued)

(52) U.S. Cl.
CPC .... *H04W 56/0015* (2013.01); *G06K 19/0723* (2013.01); *H04B 5/0031* (2013.01);
(Continued)

(58) Field of Classification Search
CPC .............. H04W 56/0015; H04W 4/80; H04W 12/00407; H04B 5/0025; H04B 5/0031;
(Continued)

(56) References Cited

U.S. PATENT DOCUMENTS 9,559,833 B1 * 1/2017 Xu ..................... H04W 56/0035
2016/0294398 A1 * 10/2016 Verlinden ............... H03L 7/087
(Continued)

FOREIGN PATENT DOCUMENTS

CN    206820749 U    12/2017
EP    3276986 A1    1/2018

OTHER PUBLICATIONS

Gebhart, Michael et al., "Active load modulation for contactless near-field communication," IEEE International Conference on RFID-Technologies and Applications, Nov. 5, 2012, pp. 228-233.

*Primary Examiner* — Paul H Masur
(74) *Attorney, Agent, or Firm* — Slater Matsil, LLP (57) ABSTRACT

Data frames, including bursts of an active load modulation (ALM) carrier signal generated from a modulation of an underlying carrier, are transmitted from an object to a reader. Synchronizing a reader carrier signal and the ALM carrier signal includes: prior to transmission of each data frame and between some of the bursts of the ALM carrier signal of each data frame, performing a closed-loop control of an output signal of a main oscillator onto a phase and a frequency of the reader carrier signal; estimating a ratio between a frequency of the output signal of the main oscillator and a frequency of a reference signal produced by a reference oscillator; and during each burst of the ALM carrier signal of each data frame, performing a closed-loop control in frequency only of the output signal of the main oscillator onto the reference frequency of the reference signal corrected by the ratio.

20 Claims, 5 Drawing Sheets

(51) Int. Cl.
*H04B 5/00* (2006.01)
*G06K 19/07* (2006.01)
*H04L 27/18* (2006.01)

(52) U.S. Cl.
CPC ......... *H04B 5/0075* (2013.01); *H04L 7/0331* (2013.01); *H04L 27/18* (2013.01)

(58) Field of Classification Search
CPC ..... H04B 5/0075; H04L 7/0331; H04L 27/18; H04L 2027/0053
See application file for complete search history.

(56) References Cited

U.S. PATENT DOCUMENTS

| | | |
|---|---|---|
| 2017/0146578 A1 | 5/2017 | Houdebine et al. |
| 2018/0006801 A1* | 1/2018 | Hung ............... H04N 21/25808 |
| 2018/0034505 A1* | 2/2018 | Dedieu .................. H03L 7/099 |
| 2018/0110018 A1* | 4/2018 | Yu ........................ H04B 5/0062 |
| 2018/0160383 A1* | 6/2018 | Nakano ................ H04B 5/0075 |
| 2018/0324012 A1* | 11/2018 | Stiglic ................. H04L 27/2071 |
| 2019/0020467 A1* | 1/2019 | Stiglic ................. G06K 19/0723 |

* cited by examiner

SYNCHRONIZATION BETWEEN A READER AND AN OBJECT IN CONTACTLESS COMMUNICATION WITH THE READER BY ACTIVE LOAD MODULATION

CROSS-REFERENCE TO RELATED APPLICATIONS

This application claims the benefit of French Application No. 1850428, filed on Jan. 19, 2018, which application is hereby incorporated herein by reference.

TECHNICAL FIELD

This disclosure relates generally to wireless or contactless communications between a reader and an object, and in particular embodiments to synchronization between a reader and an object contactlessly communicating with the reader by active load modulation.

BACKGROUND

Near-field communications, better known by those skilled in the art under the acronym NFC, is a wireless or contactless connectivity technology which enables communications over a short distance, for example 10 cm, between electronic devices, such as for example contactless smartcards or mobile telephones emulated in card mode, and readers.

NFC technology is particularly well-suited for connecting any type of user device and allows fast and easy communications.

A contactless object is an object capable of exchanging information via an antenna with another contactless object, for example a reader, according to a contactless communications protocol.

An NFC object, which is a contactless object, is an object compatible with NFC technology.

NFC technology is an open technological platform standardized in the ISO/IEC 18092 and ISO/IEC 21481 standards but incorporates numerous already-existing standards such as for example the type A and type B protocols defined in the ISO-14443 standard which may be communications protocols usable in NFC technology.

Aside from its conventional function as a telephone, a cellular mobile telephone may be used (if it is equipped with specific circuitry) for exchanging information with another contactless device, for example a contactless reader, using a contactless communications protocol usable in NFC technology.

This allows information to be exchanged between the contactless reader and secure processing elements situated within the mobile telephone. Numerous applications are thus possible such as mobile ticketing in public transport (e.g. where the mobile telephone behaves as a travel ticket) or else mobile payment (e.g. where the mobile telephone behaves as a payment card).

During a transmission of information between a reader and an object emulated in tag or card mode, the reader generates a magnetic field by its antenna which is generally, in the standards conventionally used, a sine wave at 13.56 MHz. The intensity of the magnetic field is in the range between 0.5 and 7.5 amps/meter RMS (for "Root Mean Square").

Two modes of operation are then possible: a passive mode or an active mode.

In passive mode, only the reader generates the magnetic field and the object, emulated in tag or card mode, is then passive and plays the role of the target.

More precisely, the antenna of the object emulating the tag or the card modulates the field generated by the reader.

This modulation is carried out by modifying the load connected to the terminals of the antenna of the object.

By modifying the load across the terminals of the antenna of the object, the output impedance of the antenna of the reader changes owing to the magnetic coupling between the two antennas. This results in a change in the amplitudes and/or the phases of the voltages and currents present on and in the antennas of the reader and of the object.

Accordingly, in this way, the information to be transmitted from the object to the reader is transmitted by load modulation to the antenna currents of the reader.

The variation in load effected during the load modulation leads to a modulation in amplitude and/or in phase of the signal (voltage or current) on the antenna of the reader. A copy of the antenna current is generated and injected into the receiver chain of the reader where this current is demodulated and processed in such a manner as to extract the transmitted information.

In the active mode of operation, the reader and the object emulated in card mode both generate an electromagnetic field. Generally, this mode of operation is used when the object is equipped with its own power supply, for example a battery, as is the case in a cellular mobile telephone which is then emulated in card mode.

Each of the NFC devices transmits data using a modulation scheme, for example a modulation scheme of the Manchester Binary Phase Shift Keying (BPSK) type.

Here again, the modulation corresponds to a load modification and this is then referred to as a communication by active load modulation.

With respect to a passive mode of communication, greater operational distances are obtained which can go as far as 20 cm depending on the protocol used.

Furthermore, the use of an active load modulation allows very small antennas to be used.

However, this type of communication by active load modulation poses other problems. This is because, during the periods of active communication of the device emulated in card mode, the electromagnetic field of the reader is not directly observable, and this may lead to an asynchronous response from the object emulated in card mode and, as a consequence, to a signal received by the reader exhibiting a phase-shift, in particular during long periods of emission by the device emulated in card mode.

Accordingly, if two independent devices are considered, namely the reader and an object emulated in card mode, capable of contactless communication by active load modulation, there consequently exists a need to reduce as far as possible, or even eliminate, this phase-shift.

One solution has been described in the French Patent application, filed under French Application No. 1657226, which is, in particular, applicable to a continuous transmission mode where the object emits, either in phase or in phase opposition, the extracted reader clock no longer being accessible during the emission from the card.

More precisely, according to this solution, prior to transmission by the object, a calibration phase allows a main oscillator to lock in phase and in frequency onto the clock signal received from the reader. Then, during a phase for transmission of information from the object to the reader, the ALM clock signal generated by the object, which will allow the data to be transmitted via a modulation to the reader, is closed-loop controlled in frequency onto the frequency of a reference oscillator corrected by a ratio of frequencies estimated during the calibration phase and this closed-loop control in frequency only does not modify the phase of the main clock signal which had been subjected to a prior adjustment onto that of the signal received by the object in the calibration phase.

The potential phase-shift between the clock signal received from the reader and the clock signal generated by the object is, as a consequence, reduced as far as possible or even eliminated.

Although basically satisfactory, such a solution requires a high-precision calibration prior to the transmission phase, which can be detrimental in terms of duration in some applications.

Here, another solution is accordingly provided that allows the reader clock signal (e.g. received by the object) and the ALM clock signal (e.g. generated by the object) to be synchronized without the necessity for a long and precise calibration prior to any transmission phase by the object.

This other solution may, in particular, be suitable for discontinuous modes of transmission.

SUMMARY

According to one aspect, a method is provided for contactless communication of an object with a reader by active load modulation, hereinafter referred to as ALM (according to an acronym in the field).

The method according to this aspect includes transmission of data frames from the object to the reader, each frame including bursts of ALM carrier signal generated from a modulation of an underlying carrier by a modulation scheme.

This modulation scheme may for example include a scheme chosen from within the group formed by the modulation schemes using coding schemes of the Manchester and BPSK type, without these examples being limiting.

The method according to this aspect includes a synchronization between a reader carrier signal (also referred to as a reader clock signal) and the ALM carrier signal (also referred to as a ALM clock signal).

The synchronization includes, prior to each transmission frame and between at least some of the bursts of ALM carrier signal of each transmission frame, a closed-loop control of the output signal from a main controlled oscillator (this main oscillator may be voltage controlled or else digitally controlled) onto the phase and the frequency of the reader carrier signal, and an estimation of a ratio of frequencies between the frequency of the output signal of the main oscillator and a reference frequency of a reference signal produced by a reference oscillator.

This reference oscillator, distinct from the main controlled oscillator, delivers a reference signal whose reference frequency may be identical to or different from that of the output signal of the main oscillator.

The said synchronization furthermore includes, during each burst of ALM carrier signal of each transmission frame, a closed-loop control in frequency only of the output signal of the main oscillator onto the frequency of the reference signal corrected by the said estimated ratio.

The ALM carrier signal (e.g. ALM clock signal) then comes from the output signal of the main oscillator.

Thus, prior to each frame transmitted from the object to the reader, the main oscillator locks onto the phase and frequency of the carrier clock signal received from the reader. This allows the aforementioned ratio of frequencies to be estimated.

This ratio of frequencies is again estimated (or updated) between at least some of the bursts of the ALM carrier signal of a transmission frame. The update frequency depends on the modulation scheme used.

When each burst is emitted, the ALM clock signal, delivered by the object and which, by a modulation according to the chosen modulation scheme, allows the data to be transmitted to the reader, is closed-loop controlled in frequency only onto the frequency of the reference oscillator, corrected by the estimated ratio of frequencies (which will therefore result in fine in an ALM clock signal having the desired frequency, for example 13.56 MHz) and this closed-loop control in frequency only does not modify the phase of the ALM clock signal which had been subjected to a prior adjustment onto that of the clock signal received by the object coming from the reader, prior to the transmission frame or between the emission bursts.

Thus, not only is the phase-shift between the clock signal received from the reader and the clock signal generated by the object reduced to the minimum, or even eliminated, but it is not necessary to perform a long and precise calibration for locking the phase and frequency of the main oscillator onto the clock signal received from the reader since the ratio of frequencies, estimated prior to each transmission frame, is subsequently re-estimated or updated during the transmission frame between at least some of the emission bursts.

Since the cards of the prior art do not have phase synchronization during transmission, and accordingly require a calibration prior to transmission, they may experience problems linked to interference fields.

More precisely, in a ticketing application for example, a reader having a slightly different carrier frequency (for example 13.56 MHz+/−7 kHz) from that of the reader (for example 13.56 MHz) cooperating with the card in question, may affect the precision of the said calibration.

The method provided hereinbefore furthermore solves this problem of the interference fields since the synchronization takes place between at least some of the bursts of the ALM carrier signal of a transmission frame.

This mechanism (closed-loop control in phase and in frequency, estimation of the ratio of frequencies and closed-loop control in frequency only corrected by the estimated ratio of frequencies) may be obtained in different ways, in particular depending on the modulation scheme used and/or the analog or digital technology used, for example, using the intermittent operation of a phase-locked loop combined with a frequency-locked loop and by intermittently placing this phase-locked loop into "freewheeling" mode, only the frequency-locked loop then operating, or else, for example, by sampling the two loops at two different frequencies, namely: the frequency-locked loop sampled at the frequency of the reference signal, and the phase-locked loop sampled at the frequency of the reader carrier signal (reader clock signal), or at the frequency of an underlying carrier, or at any other frequency, or else by bursts or packets of reader clock frequency.

According to one embodiment, the closed-loop control of the output signal of the main oscillator and the estimation of the ratio of frequencies are carried out by a system including a phase-locked loop having a first loop filter and a frequency-locked loop, the output of the first loop filter of the phase-locked loop forming a setpoint word for the frequency-locked loop.

The frequency-locked loop includes a second loop filter connected to the output of the first loop filter, the phase-locked loop then having a global loop filter comprising the first loop filter and the second loop filter.

The closed-loop control in frequency is carried out by the frequency-locked loop.

Furthermore, according to one embodiment applicable, by way of non-limiting example, to a modulation scheme including a scheme using an encoding of the Manchester type, during each burst of ALM carrier signal of each transmission frame, the output of the first loop filter is fixed and the output signal of the main oscillator is closed-loop controlled in frequency only onto the frequency of the reference signal corrected by the output word from the first loop filter.

According to another possible embodiment applicable, by way of non-limiting example, to a modulation scheme including a scheme using an encoding of the BPSK type, the phase-locked loop, here digital, may be sampled at the frequency of the reader carrier signal (for example 13.56 MHz) prior to each transmission frame, and may be sampled at the frequency of the underlying carrier (for example 847.5 kHz) within each transmission frame.

However, the phase-locked loop could be sampled at another frequency within each transmission frame.

Thus, in this case, the phase-locked loop is not in fact in freewheeling mode within each transmission frame, but simply sampled at a frequency different from that at which it is sampled prior to each transmission frame. For this purpose, the cut-off frequency of the phase-locked loop is lower than the frequency of the underlying carrier which here is its sampling frequency.

Then, advantageously, the values of the coefficients of the first loop filter of the phase-locked loop are modified for each transmission frame with respect to the values of these coefficients prior to each transmission frame in such a manner as to conserve the same cut-off frequency for the phase-locked loop before and during each transmission frame.

It should be noted here that the method may advantageously use two loops sampled at two different frequencies, namely: the frequency-locked loop sampled at the frequency of the reference signal, and the phase-locked loop sampled at the frequency of the reader carrier signal (reader clock signal), or at the frequency of an underlying carrier, or at any other frequency, or else by bursts or packets of reader clock frequency.

According to another aspect, an object is provided, for example a telephone emulated in card mode, that is capable of contactless communication with a reader by active load modulation called ALM.

The object includes a processor configured for transmitting data frames from the object to the reader, each frame including bursts of ALM carrier signal generated from a modulation of an underlying carrier by a modulation scheme.

The processor includes a synchronization circuit configured for performing a synchronization between a reader carrier signal and the ALM carrier signal.

The synchronization circuit is configured for generating the ALM carrier signal starting from the output signal of a main controlled oscillator, and includes a first closed-loop control circuit configured for carrying out a closed-loop control of the output signal of the main oscillator onto the phase and the frequency of the reader carrier signal, an estimation circuit configured for performing an estimation of a ratio of frequencies between the frequency of the output signal of the main oscillator and a reference frequency of a reference signal produced by a reference oscillator, a second closed-loop control circuit configured for carrying out a closed-loop control in frequency only of the output signal of the main oscillator onto the frequency of the reference signal corrected by the estimated ratio, and a control circuit configured for activating the first closed-loop control circuit and the estimation circuit prior to each transmission frame and between at least some of the bursts of ALM carrier signal of each transmission frame, and for activating the second closed-loop control circuit during each burst of ALM carrier signal of each transmission frame.

According to one embodiment, the first closed-loop control circuit and the estimation circuit include a phase-locked loop including the main oscillator and a first loop filter, and a frequency-locked loop having a reference input for receiving the reference signal, a second loop filter connected to the output of the first loop filter, the output of the first loop filter forming a setpoint word for the frequency-locked loop, the phase-locked loop having a global loop filter including the first loop filter and the second loop filter, and the second closed-loop control circuit including the frequency-locked loop.

According to one embodiment, applicable by way of non-limiting example to a modulation scheme including a scheme using an encoding of the Manchester type, during each burst of ALM carrier signal of each transmission frame, the control circuit is configured for disabling the phase-locked loop and fixing the output of the first loop filter in such a manner as to closed-loop control in frequency only the output signal of the main oscillator onto the frequency of the reference signal corrected by the output word of the first loop filter.

According to another embodiment, the phase-locked loop is sampled at the frequency of the reader carrier signal prior to each transmission, and at another frequency, for example the frequency of the underlying carrier, within each transmission frame.

The modulation scheme may for example include a scheme using an encoding of the BPSK type.

The control circuit is advantageously configured for modifying the values of the coefficients of the first loop filter for each transmission frame with respect to the values of these coefficients prior to each transmission frame so as to conserve the same cut-off frequency for the phase-locked loop before and during each transmission frame.

BRIEF DESCRIPTION OF THE DRAWINGS

Other advantages and features of the invention will become apparent upon reading the detailed description of embodiments and their implementation, which are in no way limiting, and from the appended drawings in which.

DETAILED DESCRIPTION OF ILLUSTRATIVE EMBODIMENTS

Various embodiments relate to the wireless or contactless communications between a reader and an object, for example but not limited to a mobile telephone emulated in card mode, in particular a near-field communications (NFC) object, notably a communication by active load modulation (ALM) and, more particularly, the synchronization between the reader carrier signal (which may also be referred to as a reader clock signal) received and extracted by the object and the ALM carrier signal (which may also be referred to as an ALM clock signal) generated by the object.

Figure 1:
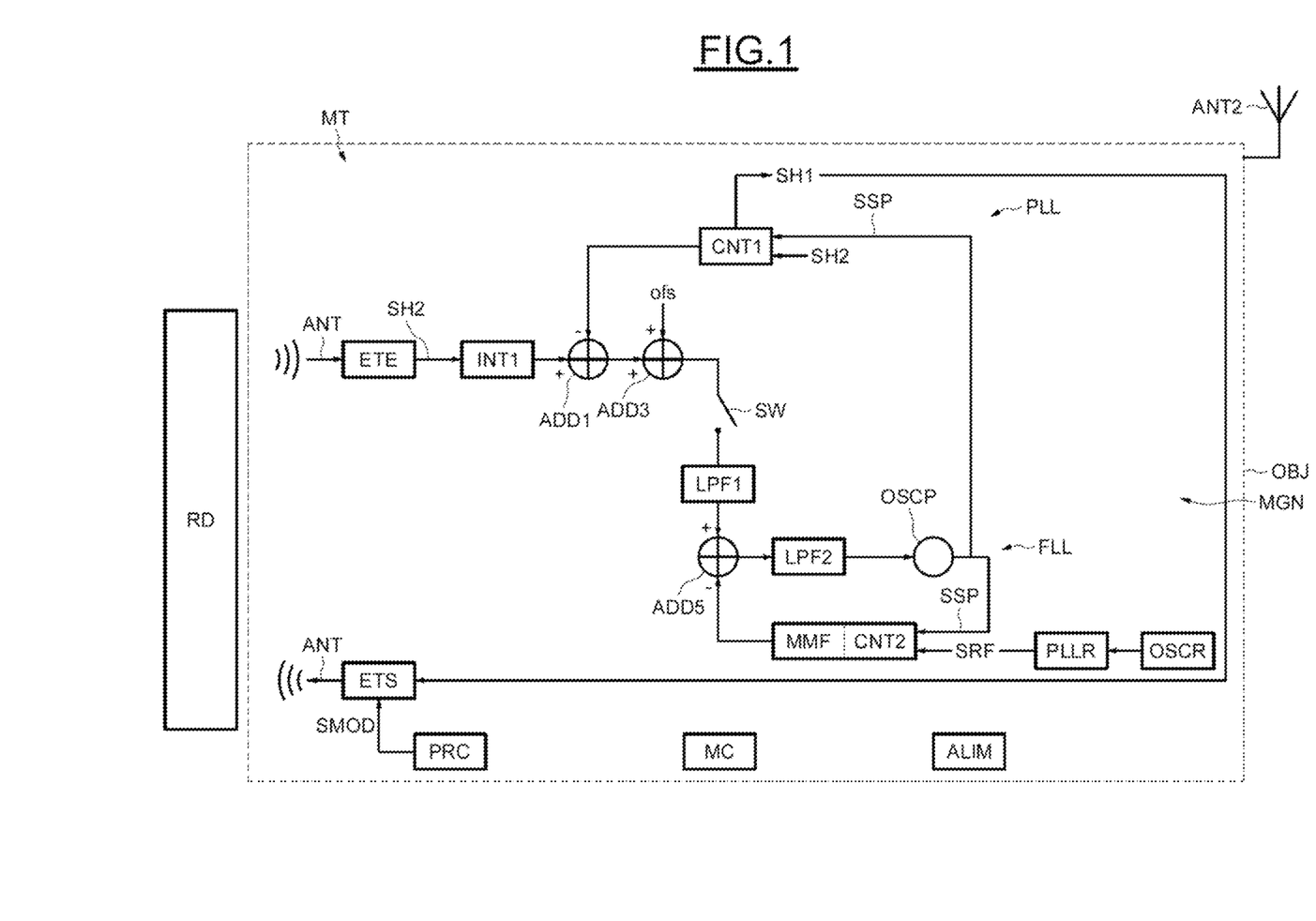
FIGS. 1 to 9 illustrate schematically various embodiments of the invention and their implementation.

In FIG. 1, the reference OBJ denotes an object, for example a cellular mobile telephone including an antenna ANT2 for the telephone communications. Furthermore, this telephone includes a processor MT designed to manage a contactless communication via another antenna ANT, for example an inductive coil, with a reader RD by an active load modulation, known as ALM.

As a variant, the two antennas ANT2 and ANT may be one and the same antenna, in this case using a coupling by a transformer of the symmetric-asymmetric type commonly denoted by those skilled in the art under the term "BALUN" (an acronym for BALanced to UNbalanced).

Consequently, in this case, the object OBJ is emulated in card mode and may include its own power supply ALIM, for example a battery, allowing it, in the framework of the active load modulation, to generate its own electromagnetic field through the antenna ANT.

The processor MT includes, aside from the antenna ANT, a receiver input stage, of conventional structure known per se, delivering a clock signal SH2 received from the reader RD. This clock signal SH2 is a reader carrier signal that has, for example, a frequency of 13.56 MHz.

The processor MT furthermore includes an output stage ETS connected to the antenna ANT configured for modulating the electromagnetic field during a transmission phase using a clock signal SH1 and a modulation signal SMOD.

The clock signal SH1 is the ALM carrier signal.

The modulation signal SMOD typically includes modulation symbols +1, 0, delivered at the cadence of a frequency of an underlying carrier (847.5 KHz in the present case). Of course, this example is not limiting and other frequencies of underlying carrier will be possible.

In practice, for a frequency of underlying carrier of 847.5 KHz and for a data encoding of the BPSK (Binary Phase Shift Keying) type, whenever the modulation symbol is equal to 1, the signal SH1 is in the high state, whereas when the modulation symbol is equal to 0, the signal SH1 is in the low state.

The modulation signal SMOD is delivered in a conventional manner by a receiver processing circuit PRC which furthermore carries out the processing of the received symbols coming from the carrier signal of the reader.

The signal delivered at the exit of the output stage ETS is therefore a modulated carrier signal generated by the object and containing the information to be transmitted to the reader.

Furthermore, for the sake of simplification, although two antennas ANT have respectively been shown coupled to the stage ETE and to the stage ETS, these are in fact really one and the same antenna ANT.

The processor MT also includes synchronization circuit MGN configured for generating the main clock signal SH1 starting from the output signal SSP of a main oscillator OSCP. This oscillator OSCP here is a digitally-controlled oscillator but it could also be a voltage-controlled oscillator.

Generally speaking, the synchronization circuit MGN includes first closed-loop control circuit configured for carrying out a closed-loop control of the output signal SSP of the main oscillator onto the phase and the frequency of the clock signal SH2 received from the reader.

The synchronization circuit MGN furthermore includes an estimation circuit configured for performing an estimation of a ratio of frequencies between the frequency FRP of the output signal SSP of the main oscillator OSCP and a reference frequency FRF of a reference signal SRF produced by a reference oscillator OSCR. In the example described here, a phase-locked loop PLLR is associated with the oscillator OSCR. Of course, this example is not limiting and other ways of generating the reference signal SRF are possible.

The synchronization circuit MGN also includes second closed-loop control circuit configured for carrying out a closed-loop control in frequency only of the output signal SSP of the main oscillator onto the frequency of the reference signal SRF corrected by the estimated ratio FRP/FRF.

Furthermore, as will be described in more detail hereinafter, control circuit MC is configured for activating the first closed-loop control circuit and the estimation circuit at certain moments in time and for activating the second closed-loop control circuit at other moments in time.

Several embodiments are possible for implementing these various circuits of the processor MT and/or the synchronization circuit MGN.

FIG. 1 illustrates one of these embodiments.

More precisely, the first closed-loop control circuit and the estimation circuit here include a phase-locked loop PLL, together with a frequency-locked loop FLL.

The phase-locked loop PLL notably includes an integrator INT1, a first loop filter LPF1, the main oscillator OSCP and also a counter CNT1 receiving, on the one hand, the output signal SSP from the main oscillator and the clock signal SH2 received from the reader.

The output of the counter CNT1 is looped back onto the output of the integrator INT1 via an adder ADD1.

In the following part of the text and by abuse of language usually employed by those skilled in the art, the term "adder" encompasses the function "summation" or the function "subtraction", according to the signs + or – appearing on the inputs of the adder.

Furthermore, optionally, an adder ADD3 allows a phase-shift ofs to be added that is representative of the phase-shift experienced by the circuit(s) disposed between the antenna and the phase-locked loop PLL.

The frequency-locked loop FLL also includes the main oscillator OSCP, and a reference input for receiving the reference signal SRF and configured for receiving the content of the first loop filter LPF1 as a setpoint word.

The reference input is the timing input of a flip-flop of a counter CNT2 furthermore receiving the signal SSP.

The second closed-loop control circuit includes the frequency-locked loop FLL.

In the example described here, compatible with the NFC contactless communications protocols, the frequency of the signal SH2 is equal to 13.56 MHz and this frequency is the clock signal SH1.

In contrast, in the present case, the frequency of the output signal SSP of the main oscillator is chosen to be equal to N×13.56 MHz, with N for example equal to 64.

With regards to the frequency FRF of the reference signal SRF delivered by the reference oscillator OSCR, it may have any given value but, in practice, it is chosen to be in the range between around ten MHz and around a hundred MHz, for example 18 MHz, without this example being limiting.

With values of 867.84 MHz (i.e., 64×13.56 MHz) and of 18 MHz for the frequency FRP of the signal SSP and that FRF of the signal SRF, respectively, the ratio of frequencies between the frequency FRP and the frequency FRF is consequently equal to 48.2133.

In the present case, while the output of the counter CNT1 delivers the difference in phase between the signals SH2 and SSP, one of the flip-flops of the counter CNT1 delivers the signal SH1 whose frequency is that of the oscillator OSCP divided by N, for example 64, with respect to that of the signal SSP so as to recover the frequency of the signal SH2, here 13.56 MHz.

However, in order to perform this division by N, a parallel divider of the counter CNT1 could also be used.

Figure 2:
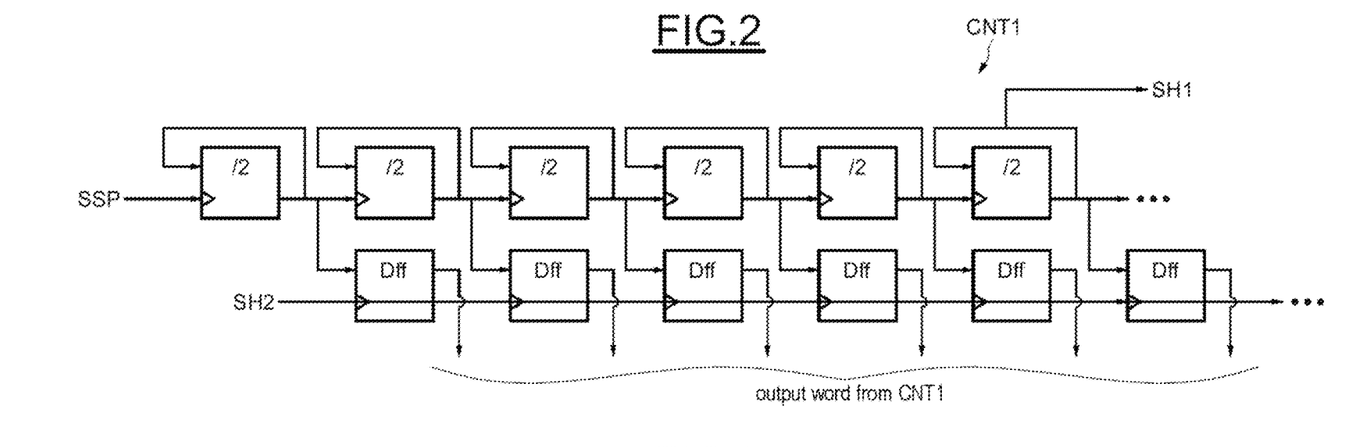

One non-limiting exemplary embodiment of the counter CNT1 is illustrated in FIG. 2.

The signal SSP coming from the oscillator OSCP increments the counter CNT1 including, for example, dividers by 2 coupled in series. The signal SH2 controls flip-flops D, referenced Dff, into which the counting result is input at each edge of the signal SH2.

The output SH1 corresponds to the Nth division of SSP.

Figure 3:
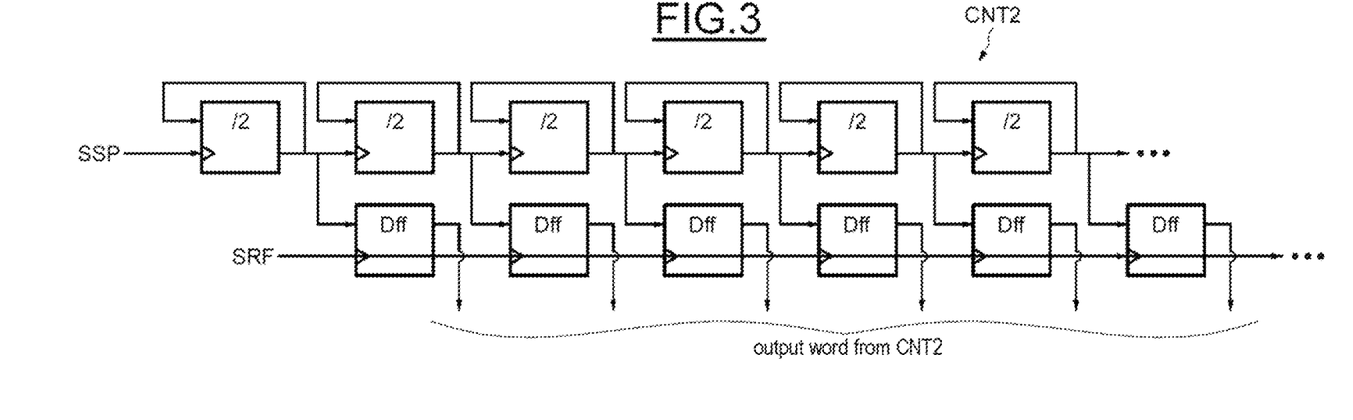

One exemplary embodiment of the counter CNT2 is illustrated in FIG. 3.

The structure of the counter CNT2 is identical to that of the counter CNT1. However, it is the signal SRF which controls flip-flops D, referenced Dff, into which the counting result is input at each edge of the signal SRF. The reference input which receives the signal SRF is the timing input of each flip-flop Dff.

The output of the counter CNT2 is connected to the input—of an adder ADD5 via frequency measurement circuit MMF.

The input + of the adder ADD5 is connected to the output of the first loop filter LPF1.

The output of the adder ADD5 is connected to the input of a second loop filter LPF2, which is the loop filter of the frequency-locked loop FLL.

The frequency measurement circuit MMF delivers the current value of the ratio of frequencies FRP/FRF by successive differences of the counting result supplied by the counter CNT2, and hence forms the aforementioned circuit for estimating the ratio of frequencies FRP/FRF.

However, it would be possible as a variant, in order to estimate this ratio of frequencies, to use a processing circuit block allowing measurements sliding between the frequency of the signal SSP and that of the signal SRF to be performed, as described for example in the French Patent application No. 1561153.

The global loop filter of the phase-locked loop PLL includes the first loop filter LPF1 together with the second loop filter LPF2 of the frequency-locked loop FLL.

The two loop filters LPF1 and LPF2 of the phase-locked loop PLL and frequency-locked loop FLL are filters of conventional structure (typically integrator-stabilizer filters) and the cut-off frequency of the frequency-locked loop is higher than that of the phase-locked loop.

As illustrated in FIG. 1, the output of the adder ADD3 may be disconnected from the input of the first loop filter LPF1 by a switch SW controllable by the control circuit MC.

Here, the switch SW is shown so as to illustrate a functional switching between various elements. There are of course various ways of implementing this switching; transistors may be used or for example the operation of some of these circuits may be fixed.

An analog technology or a digital technology may be used.

When digital loops are used, this switch SW may advantageously be implemented by a simple masking of the clock signal SH2 in such a manner that the digital processors of the phase-locked loop PLL are for example timed only when it is desirable.

Thus, for example, the phase-locked loop PLL may be sampled at 13.56 MHz before transmission, then either by packets of 13.56 MHz during transmissions using a modulation scheme of the Manchester type or else by underlying sampling at 847.5 KHz during transmissions using a modulation scheme of the BPSK type.

Figure 6:
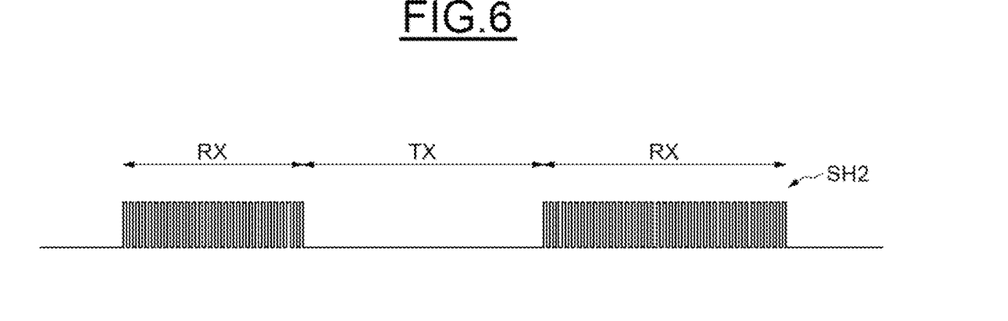
Figure 7:
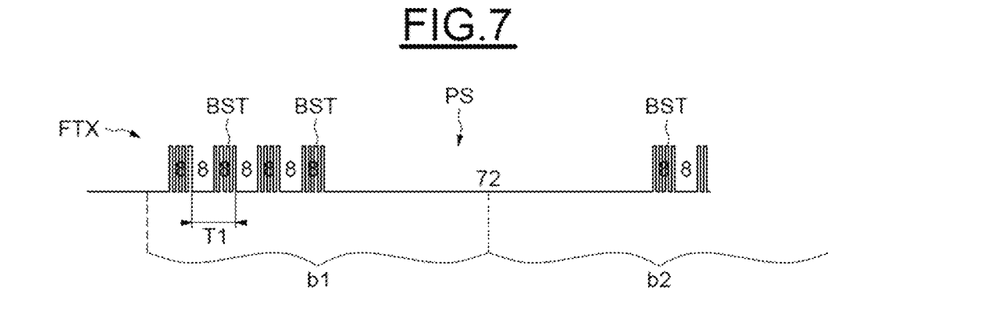
Figure 9:
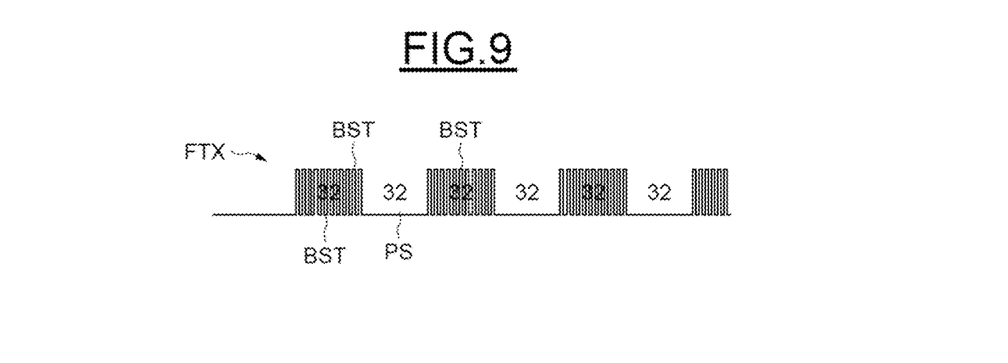

Reference is now more particularly made to FIGS. 6, 7 and 9 in order to describe at which moments in time the switch SW may for example be opened or closed.

FIG. 6 illustrates, for the object, the periods of reception RX and of transmission TX of the frames from and to the reader.

During reception periods RX, the clock signal carrier SH2 delivered by the reader and extracted by the object OBJ is available. As a consequence, during these reception periods RX, in other words prior to each transmission frame, the control circuit MC closes the switch SW so as to allow the closed-loop control of the output signal SSP of the main oscillator OSCP onto the phase and the frequency of the reader carrier signal SH2 and the estimation of the ratio of frequencies FRP/FRF between the frequency of the output signal of the main oscillator FRP and the reference frequency FRF of the reference signal coming from the reference oscillator OSCR.

Although in FIG. 6, for the sake of simplification of this figure, the signal SH2 has not been shown during the transmission phases TX from the object OBJ to the reader, this signal SH2 may in fact be available and extracted by the object at certain moments in time, in particular between at least some of the bursts of ALM carrier signal generated by the object. This will be discussed in more detail with reference to FIGS. 7, 8 and 9 which illustrate various schemes for modulation of the transmission frames FTX emitted by the object in the direction of the reader.

FIG. 7 shows a modulation scheme using a coding of the Manchester type such as that described in the ISO/IEC 14443 standard.

According to this modulation scheme, the frequency of the underlying carrier is equal to the frequency of the carrier divided by 128. Thus, for a carrier frequency (frequency of the signal SH2) of 13.56 MHz, the frequency of the underlying carrier is equal to 106 kHz.

As illustrated in FIG. 7, a bit b1 of the frame FTX then includes eight periods T1 of the underlying carrier, each period T1 including a burst BST having a duration equal to eight times the period of the ALM carrier signal, preceded by a silence having a duration equal to eight times the period of the ALM carrier signal.

The four bursts BST of the bit b1 are followed by a period of silence having a duration equal to thirty six periods of the ALM carrier signal.

If the bit b2 is a bit having the same logical value as the bit b1, then, after the period of silence of thirty six periods of the ALM carrier signal, the four periods T1 of underlying carriers containing the four bursts BST of the bit b2 is retrieved.

On the other hand, if, as illustrated in FIG. 7, the bit b2 has a logical value opposite to the logical value of the bit B1, then the period of silence PS between two consecutive bursts BST is equal to seventy two times the period of the ALM carrier signal.

It is during this period PS that the switch SW is also closed for activating the phase-locked loop and re-estimating the aforementioned ratio of frequencies.

The phase-locked loop PLL therefore operates here in an intermittent manner.

On the other hand, during each transmission burst BST, the switch SW is opened so as to carry out the closed-loop control in frequency only of the output signal of the main oscillator OSC onto the frequency of the reference signal, previously corrected by the estimated ratio.

FIG. 9 illustrates another encoding scheme which is the scheme known as the F type encoding defined in the ISO/IEC 18092 standard and also based on an encoding of the Manchester type but without underlying carrier.

According to this scheme, there may be periods of silence PS of thirty two times the frequency of the carrier separating each transmission burst BST also having a length of thirty two times the period of the ALM carrier.

Here again, these periods PS could be used for activating the phase-locked loop PLL together with the circuit(s) for estimating the ratio of frequencies (switch SW closed).

Figure 4:
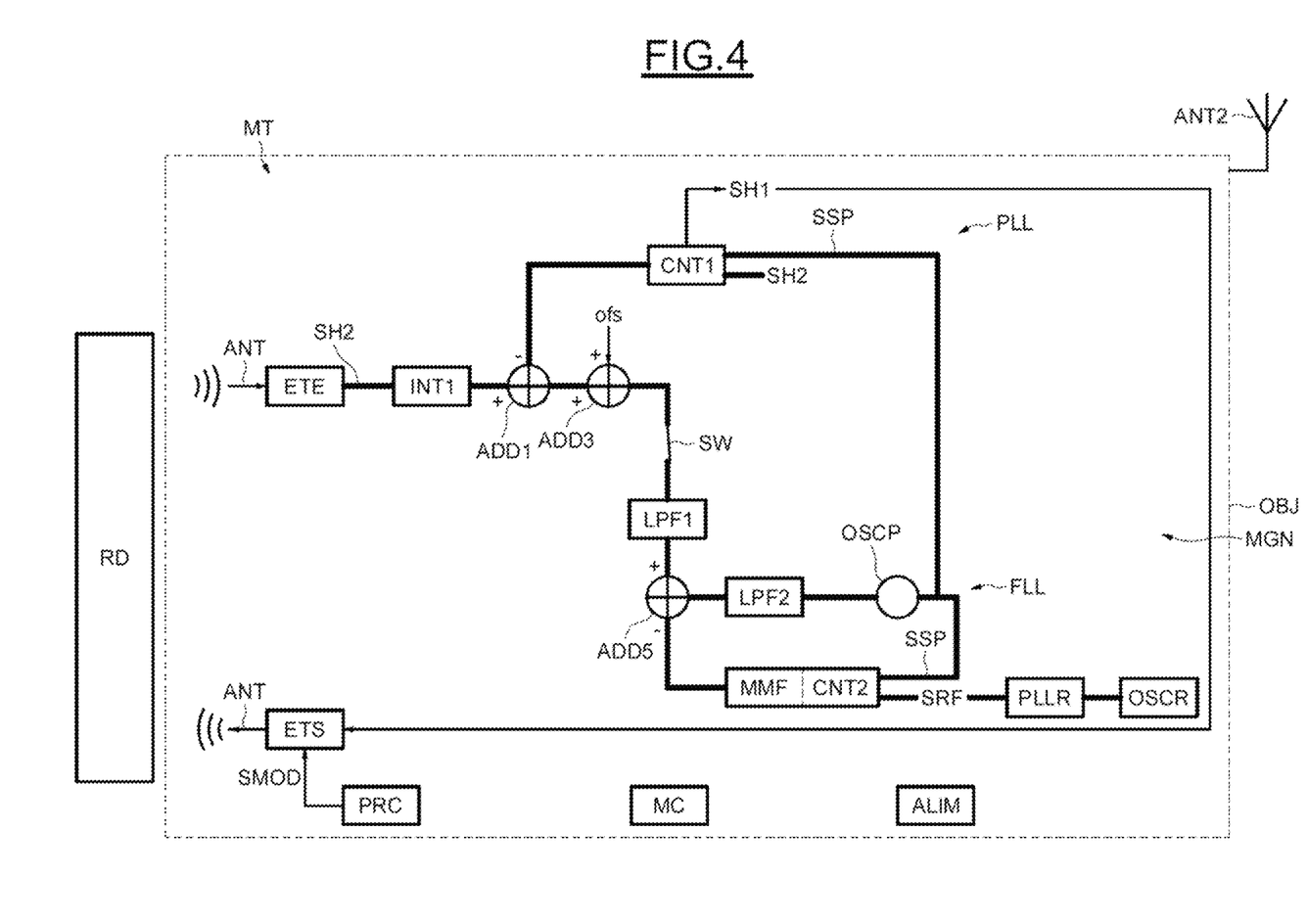

When the switch SW is closed (e.g. as shown in FIG. 4) the two loops PLL and FLL operate simultaneously. The frequency of the output signal of the oscillator OSCP is continuously closed-loop controlled by the frequency-locked loop FLL according to the setpoint word coming from the first loop filter LPF1. The frequency and the phase of the frequency-locked loop FLL is closed-loop controlled by the phase-locked loop PLL by adjusting the setpoint word of the frequency-locked loop coming from the filter LPF1. The frequency-locked loop is in fact seen as an oscillator.

In other words, the closed-loop control of the output signal SSP of the main oscillator OSCP and the estimation of the ratio of frequencies are carried out by the complete system (phase-locked loop PLL and frequency-locked loop FLL) starting from the loop filter LPF1 whose output forms a setpoint word for the frequency-locked loop. The phase-locked loop PLL makes the system converge towards the correct ratio of frequencies. The frequency-locked loop FLL here is equivalent to a low-pass filter and to an integrator (conversion from the frequency to the phase). The phase-locked loop adjusts the setpoint word which tends towards the ratio of frequencies FRP/FRF, in this case 48.2133.

Figure 5:
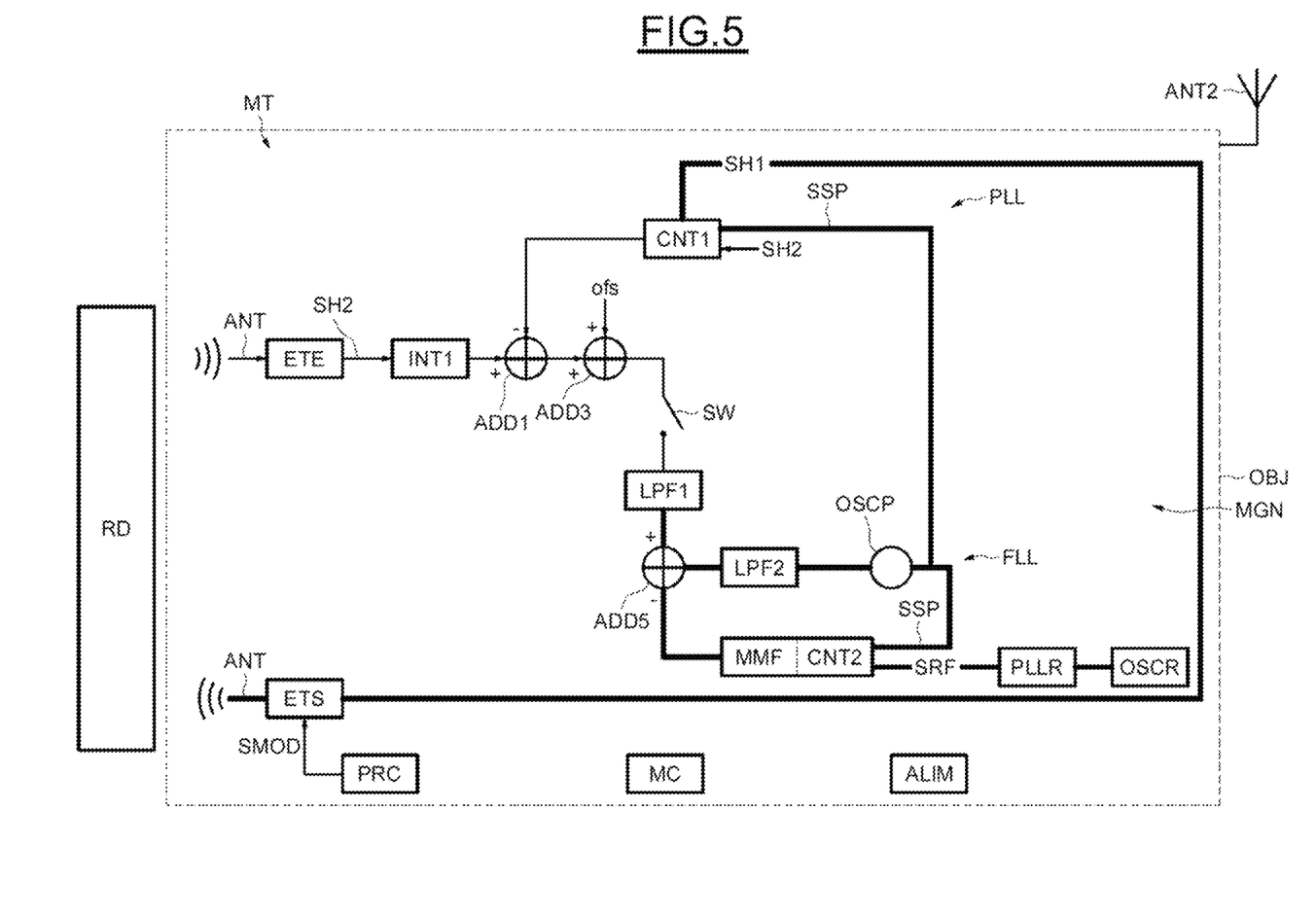

When the switch SW is open (e.g. as shown in FIG. 5), the phase-locked loop PLL is disabled and the output of the loop filter LPF1 is fixed and its output connected to the frequency-locked loop FLL allows the output signal SSP of the main oscillator to be closed-loop controlled in frequency only onto the frequency of the reference signal SRF corrected by the output word of the loop filter LPF1 which is the estimated ratio of frequencies.

Thus, because of this closed-loop control in frequency only, the phase of the signal SSP is not modified with respect to that closed-loop controlled by the phase-locked loop PLL.

Furthermore, owing to the division by 64, the frequency of the signal SH1 is equal to 13.56 MHz and the response of the object is synchronous with the signal emitted by the reader.

Figure 8:
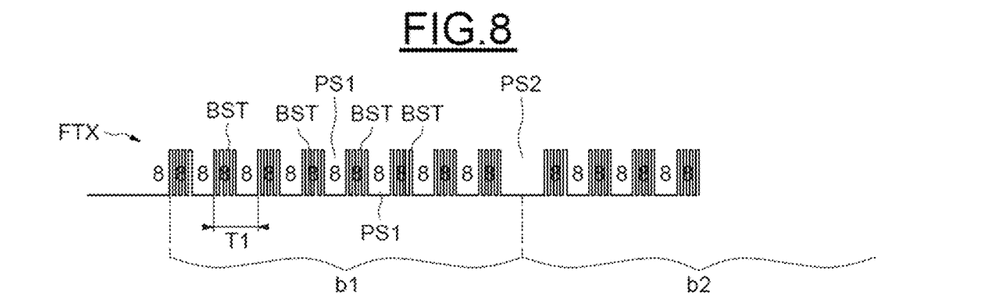

In FIG. 8, the modulation scheme uses a data encoding of the BPSK (Binary Phase Shift Keying) type.

More precisely, according to this encoding, each bit b1 has a length equal to 8T1 or T1 is the underlying carrier equal, in the present case, to around 848 kHz (13.56 MHz/16).

Within each period T1, there is a burst BST of ALM carrier signal and a period of silence PS1. The duration of the burst and of the period of silence are both equal to eight periods of the ALM carrier signal.

In certain cases, the period of silence PS1 between two emission bursts BST may be longer. This is notably the case when the bit b1 is followed by a bit b2 having an opposite logical value. In this case, the period of silence PS2 between the last burst BST of the bit b1 and the first burst BST of the bit b2 has a duration equal to sixteen periods of the ALM carrier signal.

Each burst BST produces signal oscillations at the antenna and these oscillations can interfere with the synchronization between the reader carrier signal and the ALM carrier signal.

Accordingly, in the International Patent application WO2015/003870 A1, specific damping circuits have been provided allowing such oscillations to be quickly stopped in order to allow the synchronization to be carried out. In this case, the period PS1 will advantageously be chosen for applying the closed-loop control in phase and in frequency by the loop PLL, together with the estimation of the ratio of frequencies FRP/FRF.

As indicated hereinbefore, in such an embodiment, the switch SW boils down to a masking of the clock signal SH2.

More precisely, the phase-locked loop is then sampled, no longer at 13.56 MHz as during the reception period RX, but at the frequency of the underlying carrier.

In this respect and in order to conserve the same cut-off frequency for the phase-locked loop irrespective of the sampling frequency (this cut-off frequency being lower than the sampling frequency), the values of the coefficients of the first loop filter LPF1 are modified during each transmission period TX with respect to the values of these coefficients during each reception period. In the example described here, the values of certain coefficients during the period TX are the values of these coefficients during the period RX multiplied by 16, and the values of the other coefficients during the period TX are the values of these other coefficients during the period RX divided by 16. These division and/or multiplication ratios depend notably on the architecture of the loop filter and those skilled in the art will know how to adjust these ratios in such a manner as to conserve the same cut-off frequency for the phase-locked loop irrespective of the sampling frequency.

This modification of the coefficients of the filter LPF1 is for example carried out by the control circuit MC.

However, it is also possible, by using an appropriate quality coefficient chosen for the antenna of the object, to bring to a stop, quickly and naturally, the oscillations produced after each generation of a burst, without it being necessary to use specific damping circuits. This has been described notably in the European Patent application No. 17 169 020.9.

In this case, the period PS2 will advantageously be chosen for carrying out the closed-loop control in phase and in frequency by the loop PLL, together with the estimation of the ratio of frequencies FRP/FRF.

The invention is not limited to the embodiments and their implementations which have just been described, but encompasses all their variants.

Thus, in the modulation scheme illustrated in FIG. 7, a mixed mode could also be implemented providing a sampling by bursts at 13.56 MHz during the long periods PS of silence and at 847.5 kHz during the emission bursts BST.

While the embodiments have been described in relation to the BPSK modulation type, it is noted that the embodiments are also compatible with a phase modulation of the phase-change modulation type (PSK: Phase Shift Keying).

What is claimed is:

1. A method for contactless communication of an object with a reader by active load modulation (ALM), the method comprising:

transmitting a plurality of data frames from the object to the reader, each data frame comprising bursts of an ALM carrier signal generated from a modulation of an underlying carrier by a modulation scheme; and synchronizing a reader carrier signal at the object and the ALM carrier signal, wherein the synchronization comprises:

prior to transmission of each data frame from the object to the reader and between at least some of the bursts of the ALM carrier signal of each data frame, performing a closed-loop control of an output signal of a main controlled oscillator of the object onto a phase and a frequency of the reader carrier signal;

estimating a ratio of frequencies between a frequency of the output signal of the main controlled oscillator and a reference frequency of a reference signal produced by a reference oscillator of the object; and during each burst of the ALM carrier signal of each data frame, performing a closed-loop control in frequency only of the output signal of the main controlled oscillator onto the reference frequency of the reference signal corrected by the ratio, wherein the ALM carrier signal is obtained from the output signal of the main controlled oscillator.

2. The method according to claim 1, wherein performing the closed-loop control of the output signal of the main controlled oscillator of the object and estimating of the ratio of frequencies are carried out by a system comprising:

a phase-locked loop comprising a first loop filter and a frequency-locked loop, wherein an output of the first loop filter of the phase-locked loop forms a setpoint word for the frequency-locked loop, the frequency-locked loop comprising a second loop filter connected to the output of the first loop filter, the phase-locked loop further comprising a global loop filter comprising the first loop filter and second the loop filter, wherein the closed-loop control in frequency only is performed by the frequency-locked loop.

3. The method according to claim 2, wherein, during each burst of the ALM carrier signal of each data frame, the output of the first loop filter and the output signal of the main controlled oscillator is closed-loop controlled in frequency only onto the frequency of the reference signal corrected by an output word of the first loop filter.

4. The method according to claim 3, wherein the modulation scheme comprises a scheme using an encoding of a Manchester type.

5. The method according to claim 2, further comprising sampling the phase-locked loop at the frequency of the reader carrier signal prior to transmission of each data frame and at a further frequency within each data frame.

6. The method according to claim 5, wherein the further frequency comprises a frequency of the underlying carrier.

7. The method according to claim 5, wherein the modulation scheme comprises a scheme using an encoding of a Binary Phase Shift Keying type.

8. The method according to claim 5, further comprising modifying coefficients of the first loop filter for each data frame with respect to values of the coefficients prior to transmission of each data frame.

9. The method according to claim 8, wherein a same cut-off frequency is conserved for the phase-locked loop before and during transmission of each data frame.

10. An object configured for contactless communication with a reader by active load modulation (ALM), the object comprising:

a processor;

a memory storing a program to be executed in the processor, the program comprising instructions to cause the object to transmit a plurality of data frames from the object to the reader, wherein each data frame comprises bursts of an ALM carrier signal generated from a modulation of an underlying carrier by a modulation scheme, the processor comprising:

a synchronization circuit configured for carrying out a synchronization between a reader carrier signal and the ALM carrier signal, the synchronization circuit being further configured for generating the ALM carrier signal from an output signal of a main controlled oscillator of the object, the synchronization circuit comprising:

a first closed-loop control circuit configured for carrying out a closed-loop control of the output signal of the main controlled oscillator onto a phase and a frequency of the reader carrier signal;

an estimation circuit configured for carrying out an estimation of a ratio of frequencies between a frequency of the output signal of the main controlled oscillator and a reference frequency of a reference signal produced by a reference oscillator of the object;

a second closed-loop control circuit configured for carrying out a closed-loop control in frequency only of the output signal of the main controlled oscillator onto the reference frequency of the reference signal corrected by the ratio; and a control circuit configured for activating the first closed-loop control circuit and the estimation circuit prior to transmission of each data frame and between at least some of the bursts of the ALM carrier signal of each data frame, and for activating the second closed-loop control during each burst of the ALM carrier signal of each data frame.

11. The object according to claim 10, wherein the first closed-loop control circuit and the estimation circuit comprise a phase-locked loop comprising the main controlled oscillator and a first loop filter, a frequency-locked loop having a reference input for receiving the reference signal, a second loop filter connected to an output of the first loop filter, wherein the output of the first loop filter forms a setpoint word for the frequency-locked loop, the phase-locked loop further comprising a global loop filter comprising the first loop filter and the second loop filter, and wherein the second closed-loop control circuit comprises the frequency-locked loop.

12. The object according to claim 11, wherein during each burst of the ALM carrier signal of each data frame, the control circuit is configured for disabling the phase-locked loop and fixing the output of the first loop filter to closed-loop control in frequency only the output signal of the main controlled oscillator onto the frequency of the reference signal corrected by an output word of the first loop filter.

13. The object according to claim 12, wherein the modulation scheme comprises a scheme using an encoding of a Manchester type.

14. The object according to claim 11, wherein the phase-locked loop is sampled at the frequency of the reader carrier signal prior to transmission of each data frame and at a further frequency.

15. The object according to claim 14, wherein the further frequency comprises a frequency of the underlying carrier.

16. The object according to claim 14, wherein the modulation scheme comprises a scheme using an encoding of a Binary Phase Shift Keying type.

17. The object according to claim 14, wherein the control circuit is configured for modifying coefficients of the first loop filter for each data frame with respect to values of the coefficients prior to transmission of each data frame, wherein a same cut-off frequency is conserved for the phase-locked loop before and during transmission of each data frame.

18. The object according to claim 10, wherein the object comprises a telephone emulated in card mode.

19. A non-transitory computer-readable media storing computer instructions for executing a contactless communication of an object with a reader by active load modulation (ALM), the instructions when executed by a processor cause the processor to:
   transmit a plurality of data frames from the object to the reader, each data frame comprising bursts of an ALM carrier signal generated from a modulation of an underlying carrier by a modulation scheme; and
   synchronize a reader carrier signal at the object and the ALM carrier signal, wherein the instructions to synchronize further cause the processor to:
      prior to transmission of each data frame from the object to the reader and between at least some of the bursts of the ALM carrier signal of each data frame, perform a closed-loop control of an output signal of a main controlled oscillator of the object onto a phase and a frequency of the reader carrier signal;
      estimate a ratio of frequencies between a frequency of the output signal of the main controlled oscillator and a reference frequency of a reference signal produced by a reference oscillator of the object; and
      during each burst of the ALM carrier signal of each data frame, perform a closed-loop control in frequency only of the output signal of the main controlled oscillator onto the reference frequency of the reference signal corrected by the ratio, wherein the ALM carrier signal is obtained from the output signal of the main controlled oscillator.

20. The non-transitory computer-readable media according to claim 19, wherein the instructions to perform and estimate comprises instructions that cause the processor to:
   have a phase-locked loop comprising a first loop filter and a frequency-locked loop, wherein an output of the first loop filter of the phase-locked loop forms a setpoint word for the frequency-locked loop, the frequency-locked loop comprising a second loop filter connected to the output of the first loop filter, the phase-locked loop further comprising a global loop filter comprising the first loop filter and second the loop filter,
   perform the closed-loop control in frequency only by the frequency-locked loop.

* * * * *